US012659874B2

(12) United States Patent
Hong

(10) Patent No.: US 12,659,874 B2
(45) Date of Patent: Jun. 16, 2026

(54) POWER CONTROL METHOD, USER EQUIPMENT, BASE STATION AND COMPUTER READABLE STORAGE MEDIUM

(71) Applicant: Beijing Xiaomi Mobile Software Co., Ltd., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 771 days.

(21) Appl. No.: 17/976,253

(22) Filed: Oct. 28, 2022

(65) Prior Publication Data

US 2023/0046153 A1 Feb. 16, 2023

Related U.S. Application Data

(63) Continuation of application No. PCT/CN2020/088296, filed on Apr. 30, 2020.

(51) Int. Cl.
*H04W 52/24* (2009.01)

(52) U.S. Cl.
CPC ................................. *H04W 52/243* (2013.01)

(58) Field of Classification Search
CPC .. H04B 17/327; H04W 52/00; H04W 52/243; H04W 52/346; H04W 72/04
See application file for complete search history.

(56) References Cited

U.S. PATENT DOCUMENTS 8,605,673 B2 12/2013 Xiao et al.
9,510,328 B2 11/2016 Krishnamurthy et al.
(Continued)

FOREIGN PATENT DOCUMENTS

CN 101981979 A 2/2011
CN 102045825 A 5/2011
(Continued)

OTHER PUBLICATIONS

State Intellectual Property Office of the People's Republic of China, Office Action and Search Report Issued in Application No. 2020800008064, May 31, 2023, 17 pages.
State Intellectual Property Office of the People's Republic of China, Office Action and Search Report Issued in Application No. 2020800008064, Sep. 8, 2023, 12 pages.
(Continued)

*Primary Examiner* — Nguyen T Vo
(74) *Attorney, Agent, or Firm* — Volpe Koenig

(57) ABSTRACT

Power control methods, user equipments, base stations and computer-readable storage media are provided. The method includes: a user equipment determines RSRP corresponding to each of carriers, and determines one or more carriers meeting a first preset condition based on the RSRP corresponding to each of the carriers, where the one or more carriers meeting the first preset condition refer to a carrier generating image interference. Then, the UE reports indication information corresponding to the one or more carriers meeting the first preset condition to a base station to make the base station adjust transmission power of the one or more carriers meeting the first preset condition, so as to alleviate large power difference of each carrier, thus, impact of demodulation performance of some carriers may be reduced, and decline of overall communication performance of carrier aggregation may be alleviated.

18 Claims, 4 Drawing Sheets

(56) References Cited

U.S. PATENT DOCUMENTS

| | | | |
|---|---|---|---|
| 2012/0002636 A1 | 1/2012 | Xiao et al. | |
| 2013/0044621 A1* | 2/2013 | Jung ..................... | H04J 11/005 |
| | | | 370/336 |
| 2013/0315157 A1 | 11/2013 | Krishnamurthy et al. | |
| 2014/0128115 A1 | 5/2014 | Siomina et al. | |
| 2014/0192663 A1* | 7/2014 | Rosa .................... | H04W 24/02 |
| | | | 370/252 |
| 2014/0293818 A1 | 10/2014 | Sesia et al. | |
| 2015/0351053 A1 | 12/2015 | Jeong et al. | |

FOREIGN PATENT DOCUMENTS

| | | | |
|---|---|---|---|
| CN | 102448174 A | 5/2012 | |
| CN | 102625336 A | 8/2012 | |
| CN | 104769992 A | 7/2015 | |
| CN | 104885511 A | 9/2015 | |
| CN | 108923897 A | 11/2018 | |
| WO | 2012136122 A1 | 10/2012 | |
| WO | 2012136592 A1 | 10/2012 | |

OTHER PUBLICATIONS

State Intellectual Property Office of the People's Republic of China, Decision of Rejection Issued in Application No. 2020800008064, Mar. 8, 2024, 11 pages.

Motorola,"Interference Mitigation via Power Control and FDM Resource Allocation and UE Alignment for E-UTRA Uplink and TP", R1-060401, 3GPP TSG RAN1#44, Denver, USA, Feb. 17, 2006, 6 pages.

Nokia Corporation, Nokia Siemens Networks ,"UE requirements for deactivated SCell measurements", R4-111860, 3GPP TSG-RAN WG4 Meeting #58AH, Shanghai, China, Apr. 11-15, 2011, 12 pages.

ISA State Intellectual Property Office of the People's Republic of China, Written Opinion of the International Searching Authority Issued in Application No. PCT/CN2020/088296, Jan. 15, 2021, WIPO, 7 pages.

ISA State Intellectual Property Office of the People's Republic of China, International Search Report Issued in Application No. PCT/CN2020/088296, Jan. 15, 2021, WIPO, 4 pages.

* cited by examiner

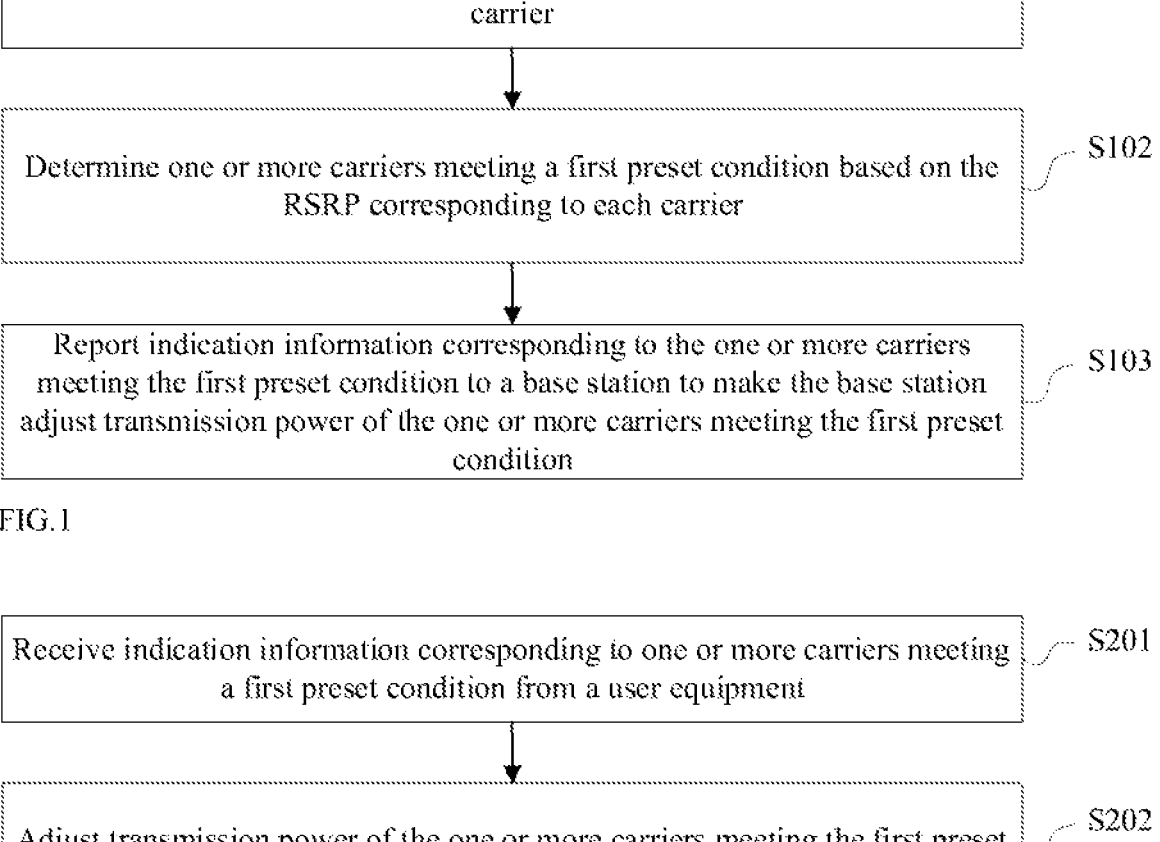

Determine Reference Signal Receiving Power (RSRP) corresponding to each carrier — S101

Determine one or more carriers meeting a first preset condition based on the RSRP corresponding to each carrier — S102

Report indication information corresponding to the one or more carriers meeting the first preset condition to a base station to make the base station adjust transmission power of the one or more carriers meeting the first preset condition — S103

FIG.1

Receive indication information corresponding to one or more carriers meeting a first preset condition from a user equipment — S201

Adjust transmission power of the one or more carriers meeting the first preset condition based on the indication information — S202

FIG.2

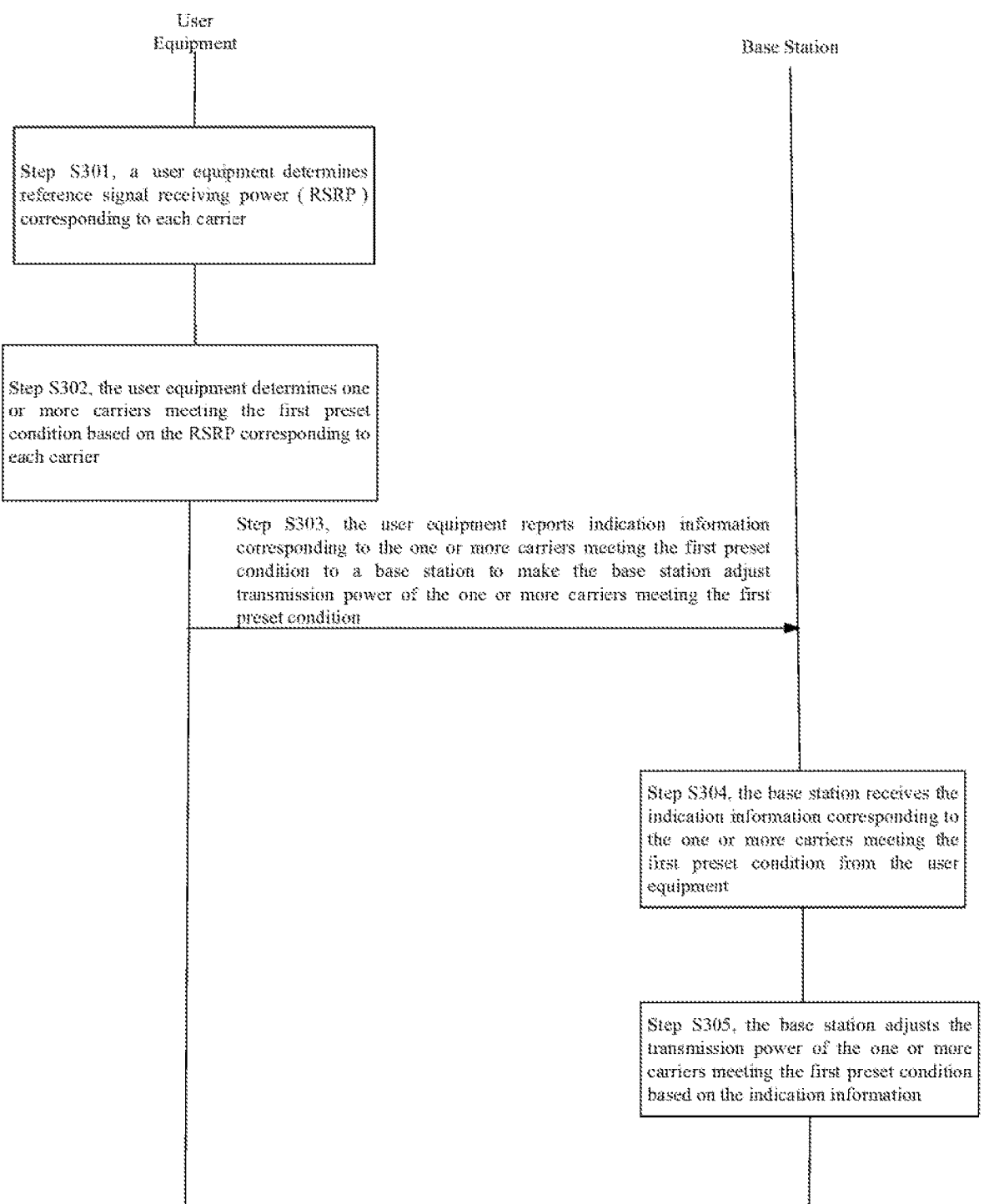

User
Equipment

Base Station

Step S301, a user equipment determines reference signal receiving power (RSRP) corresponding to each carrier Step S302, the user equipment determines one or more carriers meeting the first preset condition based on the RSRP corresponding to each carrier Step S303, the user equipment reports indication information corresponding to the one or more carriers meeting the first preset condition to a base station to make the base station adjust transmission power of the one or more carriers meeting the first preset condition Step S304, the base station receives the indication information corresponding to the one or more carriers meeting the first preset condition from the user equipment Step S305, the base station adjusts the transmission power of the one or more carriers meeting the first preset condition based on the indication information

FIG.3

POWER CONTROL METHOD, USER EQUIPMENT, BASE STATION AND COMPUTER READABLE STORAGE MEDIUM

CROSS-REFERENCE TO RELATED APPLICATION

The present application is a U.S. Continuation Application of International Application No. PCT/CN2020/088296 filed on Apr. 30, 2020, the contents of which are incorporated herein by reference in their entirety for all purposes.

TECHNICAL FIELD

The present disclosure relates to communication technologies, and in particular to power control methods, user equipment, base stations, and computer-readable storage media.

BACKGROUND

In multi-carrier systems, including for example a Carrier Aggregation (CA) technology and a Dual Connectivity (DC) technology, when power among multiple component carriers with similar frequencies is imbalanced, serious image interference may be caused, which is mainly due to an image signal generated by In-phase/Quadrature (I/Q) gain imbalance and integral deviation of a user equipment receiving circuit, when the image signal of one component carrier falls on another component carrier, image interference may be generated.

However, in some cases, for example, when carrier coverage areas expected by each component carrier are different, their aggregation may result in a large difference in power on the component carriers. In this way, an image of a component carrier with higher power may cause greater image interference on a component carrier with lower power, which may affect the demodulation performance of the component carrier with lower power, cause overall communication performance of carrier aggregation to degrade, and even cause communication interruption in serious cases.

SUMMARY

The present disclosure provides power control methods, user equipment, base stations, and computer-readable storage media to alleviate at least one of the above technical problems. Technical solutions are as follows.

In a first aspect, a power control method is provided, the power control method is performed by a user equipment (UE) and includes: determining reference signal receiving power (RSRP) corresponding to each of carriers; determining one or more carriers meeting a first preset condition based on the RSRP corresponding to each of the carriers, where the one or more carriers meeting the first preset condition refer to a carrier generating image interference; and reporting indication information corresponding to the one or more carriers meeting the first preset condition to a base station to make the base station adjust transmission power of the one or more carriers meeting the first preset condition.

In a second aspect, a power control method is provided, the power control method is performed by a base station and includes: receiving indication information corresponding to one or more carriers meeting a first preset condition from a user equipment (UE), the one or more carriers meeting the first preset condition refer to a carrier generating image interference; and adjusting transmission power of the one or more carriers meeting the first preset condition based on the indication information.

In a third aspect, a user equipment (UE) is provided, which includes: one or more processors, a memory, and one or more application programs, where the one or more application programs are stored in the memory and configured to be executed by the one or more processors to perform following operations: determining reference signal receiving power (RSRP) corresponding to each of carriers; determining one or more carriers meeting a first preset condition based on the RSRP corresponding to each of the carriers, where the one or more carriers meeting the first preset condition refer to a carrier generating image interference; and reporting indication information corresponding to the one or more carriers meeting the first preset condition to a base station to make the base station adjust transmission power of the one or more carriers meeting the first preset condition.

BRIEF DESCRIPTION OF THE DRAWINGS

In order to describe technical solutions in the embodiments of the present disclosure more clearly, the embodiments of the present disclosure are described below with reference to the accompanying drawings.

FIG. 1 is a schematic flowchart illustrating a power control method according to an embodiment of the present disclosure.

FIG. 2 is a schematic flowchart illustrating another power control method according to an embodiment of the present disclosure.

FIG. 3 is a schematic interactive flowchart illustrating a power control method according to an embodiment of the present disclosure.

DETAILED DESCRIPTION OF THE EMBODIMENTS

Figure 4:
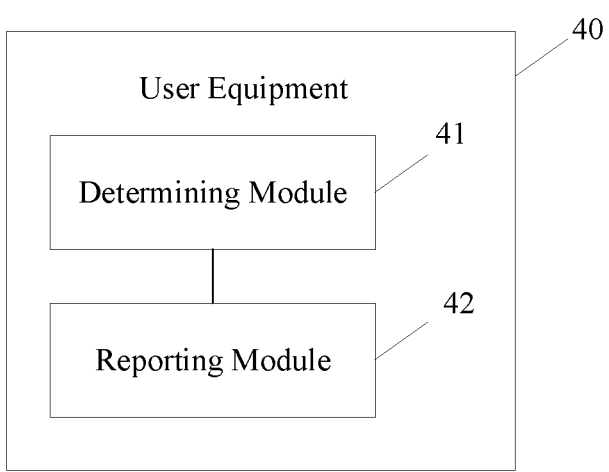
FIG. 4 is a schematic structure diagram illustrating a user equipment according to an embodiment of the present disclosure.

Embodiments of the present disclosure are described in detail below, and examples of the embodiments are shown in the accompanying drawings. The same or similar numerals from beginning to end indicate the same or similar components or components having the same or similar functions. The embodiments described below with reference to the accompanying drawings are illustrative and are only for describing the present disclosure, and cannot be interpreted as a limitation of the present disclosure.

Those skilled in the art can understand that the singular forms "one", "a/an", "the", and "this" used herein may also include the plural forms, unless specifically stated. It should be understood that the term "include or comprise" used in the specification of the present disclosure refers to the presence of the features, steps, operations, components, and/or assemblies, but does not exclude the presence or addition of one or more other features, steps, operations, components, assemblies, and/or groups of the above. It should be understood that when we say that a component is "connected" or "coupled" to another component, it can be directly connected or coupled to other components, or there can be intermediate components. In addition, "connected" or "coupled" as used herein may include wirelessly connected or wirelessly coupled. The expression "and/or" used herein includes all or any unit and all combinations of one or more associated listed items.

Beneficial effects of technical solutions provided by the embodiments of the present disclosure include the following.

Power control methods, user equipment, and computer-readable storage media are provided. Compared with related arts, in the embodiments of the present disclosure, the RSRP corresponding to each carrier is determined, and one or more carriers meeting the first preset condition are determined based on the RSRP corresponding to each carrier. The carriers meeting the first preset condition refer to the carrier generating image interference. Then, the indication information corresponding to the one or more carriers meeting the first preset condition may be reported to the base station to make the base station adjust the transmission power of the one or more carriers meeting the first preset condition, so as to alleviate large power difference of each carrier, thus, impact of demodulation performance of some carriers may be reduced, and decline of overall communication performance of carrier aggregation may be alleviated.

Power control methods, base stations, and computer-readable storage media are provided. Compared with related arts, in the embodiments of the present disclosure, the indication information corresponding to the one or more carriers meeting the first preset condition is received from the user equipment UE, the one or more carriers meeting the first preset condition refer to a carrier generating image interference, and then the transmission power of the one or more carriers meeting the first preset condition is adjusted based on the indication information. That is, in the present disclosure, the transmission power of a carrier generating image interference is adjusted according to the indication information of the carrier generating image interference and sent by the user equipment, so that power difference of each carrier may be alleviated, and impact of demodulation performance of some carriers may be reduced, thus decline of overall communication performance of carrier aggregation may be alleviated.

In order to make the purpose, technical solutions, and advantages of the present disclosure clearer, the embodiments of the present disclosure are further described in detail below in combination with the accompanying drawings.

The technical solutions of the present disclosure and how the technical solutions of the present disclosure alleviate the technical problems above are described in detail below with specific embodiments. The following several specific examples may be combined with each other, and the same or similar concepts or processes will not be described repeatedly in some examples. The embodiments of the present disclosure are described below in combination with the accompanying drawings.

The embodiments of the present disclosure provide a power control method that is performed by a user equipment, as shown in FIG. 1. The method includes the following steps.

At step S101, Reference Signal Receiving Power (RSRP) corresponding to each carrier is determined.

For embodiments of the present disclosure, a user equipment may be configured with one primary carrier and one or more secondary carriers. In the embodiments of the present disclosure, the user equipment may determine the RSRP corresponding to each carrier (including the primary carrier and the one or more secondary carriers). In the embodiments of the present disclosure, the RSRP is one of the key parameters that can represent a wireless signal strength and is one of the physical layer measurement requirements in a communication network, such as the Long-Term Evolution (LTE) network, and is an average value of signal power received on all Resource Elements (REs) carrying a reference signal within a symbol.

For the embodiments of the present disclosure, in EN-DC, a primary carrier of LTE may be the primary carrier, and one or more other carriers of LTE and carriers of NR may be the secondary carriers. In NE-DC, a primary carrier of NR may be the primary carrier, and one or more other carriers of NR and carriers of LTE may be the secondary carriers.

At step S102, one or more carriers meeting a first preset condition are determined based on the RSRP corresponding to each carrier.

The carrier meeting the first preset condition refers to a carrier generating image interference.

The carrier meeting the first preset condition may be a primary carrier or a secondary carrier.

For the embodiments of the present disclosure, the first preset condition may also be called a generation condition of power imbalance image interference; that is, the carrier meeting the first preset condition may also be called a carrier meeting the generation condition of power imbalance image interference.

At step S103, indication information corresponding to the one or more carriers meeting the first preset condition is reported to a base station to make the base station adjust the transmission power of the one or more carriers meeting the first preset condition.

For the embodiments of the present disclosure, if there is only one carrier meeting the first preset condition, the user equipment may report the indication information corresponding to the carrier meeting the first preset condition to the base station, so that the base station may adjust the transmission power of the carrier according to the reported indication information.

For the embodiments of the present disclosure, if there are at least two carriers meeting the first preset condition, the user equipment may report the indication information corresponding to each of the at least two carriers meeting the first preset condition to the base station, so that the base station may adjust the transmission power of each of the at least two carriers meeting the first preset condition based on each piece of corresponding indication information. Or, the user equipment may only report one piece of indication information to the base station, so that the base station may adjust the transmission power of each of the at least two carriers meeting the first preset condition based on the one piece of indication information. Or, the user equipment may report at least two pieces of indication information to the base station, so that the base station may adjust the transmission power of the at least two carriers meeting the first preset condition based on each of the at least two pieces of indication information.

The embodiments of the present disclosure provide a power control method. Compared with related arts, in the embodiments of the present disclosure, the RSRP corresponding to each carrier is determined, and one or more carriers meeting the first preset condition are determined based on the RSRP corresponding to each carrier. A carrier meeting the first preset condition represents a carrier generating image interference. Then, the indication information corresponding to the one or more carriers meeting the first preset condition may be reported to the base station to make the base station adjust the transmission power of the one or more carriers meeting the first preset condition, so as to alleviate large power difference of respective carriers, thus, impact of demodulation performance of some carriers may be reduced, and decline of the overall communication performance of carrier aggregation may be alleviated.

In an implementation of an embodiment of the present disclosure, the method may further include: determining Reference Signal Receiving Quality (RSRQ) corresponding to each carrier.

For the embodiments of the present disclosure, after determining the RSRQ corresponding to each carrier, in another implementation of an embodiment of the present disclosure, one or more carriers meeting the first preset condition are determined based on the RSRP corresponding to each carrier, which may specifically include: determining the one or more carriers meeting the first preset condition based on the RSRP and RSRQ corresponding to each carrier.

For embodiments of the present disclosure, a user equipment may be configured with one primary carrier and one or more secondary carriers. In embodiments of the present disclosure, the user equipment may determine the RSRP corresponding to each carrier (including the primary carrier and the one or more secondary carriers) and determine the RSRQ corresponding to each carrier (including the primary carrier and the one or more secondary carriers). The RSRQ represents the quality of a received reference signal of a communication network, such as LTE. This measure is mainly for sorting different candidate cells based on signal quality, and acts as an input for cell handover and cell reselection decisions.

For the embodiments of the present disclosure, if the user equipment is configured with one primary carrier and one secondary carrier, the carrier meeting the first preset condition may be determined based on the RSRP corresponding to the primary carrier and the RSRP corresponding to the secondary carrier, or the carrier meeting the first preset condition may be determined based on the RSRP corresponding to the primary carrier, the RSRP corresponding to the secondary carrier, the RSRQ corresponding to the primary carrier and the RSRQ corresponding to the secondary carrier.

For the embodiments of the present disclosure, if the user equipment is configured with one primary carrier and at least two secondary carriers, the carrier meeting the first preset condition may be determined based on the RSRP corresponding to the primary carrier and the RSRP corresponding to each of the at least two secondary carriers, or the carrier meeting the first preset condition may be determined based on the RSRP corresponding to the primary carrier, the RSRP corresponding to each of the at least two secondary carriers, the RSRQ corresponding to the primary carrier and the RSRQ respective corresponding to each of the at least two secondary carriers.

In an implementation of an embodiment of the present disclosure, the carrier meeting the first preset condition is determined based on the RSRP corresponding to each carrier, which includes determining first RSRP and one or more pieces of second RSRP; and determining the carrier meeting the first preset condition based on a relationship between the first RSRP and each of the one or more pieces of second RSRP.

The first RSRP includes the RSRP corresponding to the primary carrier, and the second RSRP includes the RSRP corresponding to the one or more secondary carriers.

For the embodiments of the present disclosure, if the user equipment is only configured with one primary carrier and one secondary carrier, whether the secondary carrier is the carrier meeting the first preset condition (the carrier meeting the generation condition of power imbalance image interference) is determined based on a relationship between the RSRP corresponding to the primary carrier and the RSRP corresponding to the secondary carrier. The specific implementation is detailed in the following embodiments, which will not be repeated here.

For the embodiments of the present disclosure, if the user equipment is configured with at least three carriers (may include one primary carrier and at least two secondary carriers), the RSRP corresponding to each carrier (RSRP corresponding to the primary carrier and RSRP respective corresponding to each secondary carrier) is determined, and the carrier meeting the first preset condition is determined based on a relationship between the RSRP corresponding to each of the secondary carriers and the RSRP corresponding to the primary carrier. The specific implementation is detailed in the following embodiments, which will not be repeated here.

In another implementation, one or more carriers meeting the first preset condition are determined based on relationships between the first RSRP and each of the one or more pieces of second RSRP, which includes: determining an absolute value of difference between the first RSRP and each piece of second RSRP; and determining a secondary carrier corresponding to a second RSRP with an absolute value greater than a first preset threshold as the carrier meeting the first preset condition.

For the embodiments of the present disclosure, if the user equipment is only configured with one primary carrier and one secondary carrier, the first RSRP (RSRP corresponding to the primary carrier) may be represented by $RSRP_P$, and the second RSRP (RSRP corresponding to the secondary carrier) may be represented by $RSRP_S$. Whether the secondary carrier is a secondary carrier meeting the first preset condition may be determined based on whether $|RSRP_P - RSRP_S|$ is greater than M dB (e.g., a first preset threshold). If $|RSRP_P - RSRP_S|$ is greater than M dB, the secondary carrier is determined to be the secondary carrier meeting the first preset condition. If $|RSRP_P - RSRP_S|$ is not greater than M dB, the secondary carrier is determined not to be the secondary carrier meeting the first preset condition. In the embodiments of the present disclosure, the first preset threshold may be pre-set, for example, to 6 dB.

For the embodiments of the present disclosure, if the user equipment is configured with at least three carriers, which includes one primary carrier and at least two secondary carriers, for example, the RSRP corresponding to the primary carrier P refers to $RSRP_P$, and the RSRP corresponding to other n secondary carriers S refers to $RSRP_{Sj}$, the carrier meeting the first preset condition may be determined based on whether $|RSRP_P - RSRP_{Sj}|$ is greater than the first preset threshold (M dB), where j=1, 2, . . . , n, and M represents a power imbalance threshold value. In response to determining that $|RSRP_P - RSRP_{Sj}|$ is greater than M dB, the first preset condition (power imbalance image interference condition) is met, and the secondary carrier corresponding to $|RSRP_P - RSRP_{Sj}|$ greater than M dB is determined to be the secondary carrier meeting the first preset condition. Otherwise, the first preset condition (power imbalance image interference condition) is not met, and there is no secondary carrier meeting the first preset condition (or called there is no secondary carrier meeting the power imbalance image interference condition).

In another implementation, the one or more carriers meeting the first preset condition may be determined based on the RSRP corresponding to each carrier and the RSRQ corresponding to each carrier, which includes: determining the first RSRP and the one or more pieces of second RSRP; in response to determining that a relationship between the first RSRP and at least one piece of second RSRP meets a second preset condition, determining the RSRQ corresponding to the primary carrier, and determining a relationship between the RSRQ corresponding to the primary carrier and the second preset threshold; and determining the one or more carriers meeting the first preset condition based on the relationship between the RSRQ corresponding to the primary carrier and the second preset threshold.

The first RSRP includes the RSRP corresponding to the primary carrier, and the second RSRP includes the RSRP corresponding to the one or more secondary carriers.

The relationship between the first RSRP and the at least one piece of second RSRP that meets the second preset condition includes: the at least one piece of second RSRP is greater than the first RSRP, and the difference between the first RSRP and the at least one piece of second RSRP is greater than a third preset threshold.

For the embodiments of the present disclosure, when the user equipment is configured with two carriers (one primary carrier and one secondary carrier), the user equipment may determine whether the second preset condition is met between the primary carrier and the secondary carrier. When a relationship between the secondary carrier and the primary carrier meets the second preset condition, the RSRQ corresponding to the primary carrier may be determined, and further a relationship between the RSRQ corresponding to the primary carrier and the second preset threshold may be determined, then the one or more carriers meeting the first preset condition (the carrier meeting the power imbalance image interference condition) may be determined.

For the embodiments of the present disclosure, when the user equipment is configured with two carriers (one primary carrier and one secondary carrier), a specific way to determine whether the second preset condition is met between the primary carrier and the secondary carrier is to determine whether the RSRP corresponding to the secondary carrier (the second RSRP) is greater than the RSRP corresponding to the primary carrier (the first RSRP), and whether difference between the RSRP corresponding to the secondary carrier (the second RSRP) and the RSRP corresponding to the primary carrier (the second RSRP) is greater than the third preset threshold. In the embodiments of the present disclosure, the first preset threshold and the third preset threshold may be identical or different; there is no limitation in the embodiments of the present disclosure.

For the embodiments of the present disclosure, when the user equipment is configured with at least three carriers (one primary carrier and at least two secondary carriers), the user equipment may determine whether the second preset condition is met between the primary carrier and each of the secondary carriers. When the relationship between a secondary carrier and the primary carrier meets the second preset condition, the RSRQ corresponding to the primary carrier may be determined, and further the relationship between the RSRQ corresponding to the primary carrier and the second preset threshold may be determined, the carrier meeting the first preset condition (the carrier meeting the power imbalance image interference condition) may be determined.

In another implementation of the embodiments of the present disclosure, determining the one or more carriers meeting the first preset condition based on the relationship between the RSRQ corresponding to the primary carrier and the second preset threshold may include: determining the primary carrier to be the carrier meeting the first preset condition in response to determining that the RSRQ corresponding to the primary carrier is less than the second preset threshold; and determining one or more secondary carriers respective corresponding to one or more pieces of second RSRP associated with the met second preset condition to be the one or more carriers meeting the first preset condition in response to determining that the RSRQ corresponding to the primary carrier is not less than the second preset threshold.

For the embodiments of the present disclosure, when the user equipment is configured with two carriers (one primary carrier and one secondary carrier), if a relationship between the RSRP corresponding to the secondary carrier and the RSRP corresponding to the primary carrier meets the second preset condition, and meanwhile the RSRQ corresponding to the primary carrier is less than the second preset threshold, the primary carrier may be determined to be the carrier meeting the first preset condition (the carrier meeting the power imbalance image interference condition). If the relationship between the RSRP corresponding to the secondary carrier and the RSRP corresponding to the primary carrier meets the second preset condition, and meanwhile, the RSRQ corresponding to the primary carrier is not less than the second preset threshold, the secondary carrier is determined to be the carrier meeting the first preset condition.

For the embodiments of the present disclosure, when the user equipment is configured with at least three carriers (one primary carrier and at least two secondary carriers), if a relationship between any RSRP corresponding to a secondary carrier and the RSRP corresponding to the primary carrier meets the second preset condition, and meanwhile the RSRQ corresponding to the primary carrier is less than the second preset threshold, the primary carrier is determined to be the carrier meeting the first preset condition (the carrier meeting the power imbalance image interference condition). If the relationship between a RSRP corresponding to a secondary carrier and the RSRP corresponding to the primary carrier meets the second preset condition, and meanwhile, the RSRQ corresponding to the primary carrier is not less than the second preset threshold, the secondary carrier meeting the second preset condition is determined to be the carrier meeting the first preset condition (the carrier meeting the power imbalance image interference condition).

For example, if RSRP of a secondary carrier Sj is greater than the RSRP of the primary carrier, and the secondary carrier Sj meets the power imbalance image interference condition, that is, $RSRP_{Sj} - RSRP_P > M > 0$, when determining the carrier meeting the first preset condition (the carrier meeting the power imbalance image interference condition), determining whether the RSRQ of the primary carrier is greater than the second preset threshold is further expected to determine the carrier meeting the first preset condition (the carrier meeting the power imbalance image interference condition). If it is determined that the RSRQ of the primary carrier is less than the second preset threshold, the primary carrier may be determined to be the carrier meeting the first preset condition (the carrier meeting the power imbalance image interference condition).

In another implementation of the embodiments of the present disclosure, in response to determining that the number of carriers is greater than a fourth preset threshold, the step S101 and the step S102 may specifically include: determining the first RSRP to determine at least one piece of third RSRP; and based on the at least one piece of third RSRP and at least one piece of the first RSRP or the first RSRQ, determining the carrier meeting the first preset condition.

The first RSRP may be the RSRP corresponding to the primary carrier; and the at least one piece of third RSRP may be the RSRP corresponding to each of at least one secondary carrier next to the primary carrier.

For the embodiments of the present disclosure, in response to determining that the number of the carriers is greater than the fourth preset threshold, in order to reduce unnecessary signaling loss, power imbalance image interference determining may not be performed on all secondary carriers, but only on one or more secondary carriers next to the primary carrier. That is, based on the RSRP corresponding to the primary carrier and the RSRP of the one or more secondary carriers next to the primary carrier, a carrier meeting the first preset condition is determined. In the embodiments of the present disclosure, a method for determining the carrier meeting the first preset condition is described above, and will not be repeated here.

In another implementation of the embodiments of the present disclosure, in response to determining that the number of the carriers is greater than the fourth preset threshold, the RSRP and RSRQ respective corresponding to each carrier are determined; and based on the RSRP and RSRQ respective corresponding to each carrier, the carrier meeting the first preset condition may be determined, which may specifically include: determining the first RSRP and the first RSRQ; determining at least one piece of third RSRP and at least one piece of third RSRQ; and based on the first RSRP and the at least one piece of third RSRP, the first RSRQ and the at least one piece of third RSRQ, determining the carrier meeting the first preset condition.

The first RSRP includes the RSRP corresponding to the primary carrier, and the first RSRQ includes the RSRQ corresponding to the primary carrier; the at least one piece of third RSRP includes the RSRP corresponding to each of the one or more secondary carriers next to the primary carrier, and the at least one piece of third RSRQ includes the RSRQ corresponding to each of the one or more secondary carriers next to the primary carrier.

For the embodiments of the present disclosure, when the number of the carriers is greater than the fourth preset threshold, in order to reduce unnecessary signaling loss, power imbalance image interference determining may not be performed on all secondary carriers, but only on the one or more secondary carriers next to the primary carrier. That is, the carrier meeting the first preset condition is determined based on the RSRP corresponding to the primary carrier and the RSRP corresponding to one or more secondary carriers next to the primary carrier, and the RSRQ corresponding to the primary carrier and the RSRQ corresponding to the one or more secondary carriers next to the primary carrier. In the embodiments of the present disclosure, a method for determining the carrier meeting the first preset condition is described above, and will not be repeated here.

In another implementation of the embodiments of the present disclosure, the step S103 may specifically include: reporting at least one of carrier identification, respectively corresponding to the one or more carriers meeting the first preset condition, or power adjustment information to the base station.

The power adjustment information includes at least one of the following: a power adjustment step and a power adjustment direction; or a target value for power adjustment.

For the embodiments of the present disclosure, the power adjustment step may indicate a value for the base station to increase or decrease transmission power of a carrier meeting the first preset condition; and the power adjustment direction may indicate whether the base station increases or decreases the transmission power of the carrier meeting the first preset condition.

For the embodiments of the present disclosure, the reported carrier identification may be represented by m bits, the reported power adjustment step may be represented by n bits, and the power adjustment direction may be represented by k bits, where k may be 1. There is no limitation to the number of bits in the embodiments of the present disclosure.

In another implementation of the embodiments of the present disclosure, reporting at least one of the carrier identification corresponding to each carrier meeting the first preset condition or the power adjustment information to the base station includes at least one of the following: determining the power adjustment information corresponding to each carrier meeting the first preset condition and reporting corresponding power adjustment information to the base station through the carrier meeting the first preset condition; or determining the carrier identification and power adjustment information corresponding to each carrier meeting the first preset condition, and reporting the carrier identification and power adjustment information corresponding to each carrier meeting the first preset condition to the base station through a preset carrier.

The preset carrier may be a primary carrier or a preset secondary carrier, and power adjustment information carried by a preset secondary carrier includes power adjustment information that does not belong to the power adjustment information corresponding to the preset secondary carrier.

In an implementation of the embodiments of the present disclosure, the user equipment may report power adjustment information corresponding to the carrier meeting the first preset condition to the base station through the carrier meeting the first preset condition, so that the base station may adjust transmission power corresponding to the carrier meeting the first preset condition based on the power adjustment information.

For example, if carriers meeting the first preset condition are carrier 1 and carrier 2, the user equipment can send power adjustment information 1 corresponding to the carrier 1 to the base station through the carrier 1, and sends power adjustment information 2 corresponding to the carrier 2 to the base station through the carrier 2, so that the base station adjusts transmission power corresponding to the carrier 1 based on the power adjustment information 1, and adjusts the transmission power corresponding to the carrier 2 based on the power adjustment information 2.

In another implementation of the embodiments of the present disclosure, if the user equipment uses the primary carrier or the preset secondary carrier, and power adjustment information carried by the preset secondary carrier includes power adjustment information that does not belong to power adjustment information of the preset secondary carrier, the user equipment may report identification corresponding to each carrier meeting the first preset condition and power adjustment information of each carrier meeting the first preset condition to the base station, so that the base station may determine the carrier meeting the first preset condition and the power adjustment information corresponding to each carrier.

For example, if the carriers meeting the first preset condition are carrier 1 and carrier 2, the user equipment may send carrier identification 1 and power adjustment information 1 corresponding to the carrier 1, and carrier identification 2 and power adjustment information 2 corresponding to the carrier 2 to the base station through the primary carrier, so that the base station may determine the carrier 1 is a carrier meeting the first preset condition based on the carrier identification 1, and adjust the transmission power corresponding to the carrier 1 based on the power adjustment information 1, and determine the carrier 2 is a carrier meeting the first preset condition based on the carrier identification 2 corresponding to the carrier 2, and adjust the transmission power of the carrier 2 based on the power adjustment information 2.

In another implementation of the embodiments of the present disclosure, a method for determining a power adjustment step corresponding to any carrier meeting the first preset condition includes: determining the power adjustment step corresponding to any secondary carrier meeting the first preset condition based on RSRP corresponding to the primary carrier, RSRP corresponding to the secondary carrier meeting the first preset condition, and the first preset threshold.

In another implementation of the embodiments of the present disclosure, determining the power adjustment step corresponding to any secondary carrier meeting the first preset condition based on the RSRP corresponding to the primary carrier, the RSRP corresponding to the secondary carrier meeting the first preset condition, and the first preset threshold includes: determining a difference between a first absolute value and the first preset threshold as the power adjustment step corresponding to the secondary carrier meeting the first preset condition.

The first absolute value is the absolute value of the difference between the RSRP corresponding to the primary carrier and the RSRP corresponding to any secondary carrier meeting the first preset condition.

For the embodiments of the present disclosure, the power adjustment step corresponding to any carrier meeting the first preset condition can be determined by $|RSRP_P-RSRP_{Sj}|-M$, where $RSRP_{Sj}$ represents the RSRP corresponding to a secondary carrier meeting the first preset condition, $RSRP_P$ represents the RSRP corresponding to the primary carrier, and M represents the first preset threshold.

In another implementation of the embodiments of the present disclosure, a method for determining a power adjustment direction corresponding to any carrier meeting the first preset condition, includes: determining the power adjustment direction corresponding to any secondary carrier meeting the first preset condition based on a relationship between the RSRP corresponding to the primary carrier and the RSRP corresponding to a secondary carrier meeting the first preset condition.

For the embodiments of the present disclosure, if the RSRP corresponding to the primary carrier is greater than the RSRP corresponding to the secondary carrier meeting the first preset condition, the power adjustment direction corresponding to the secondary carrier meeting the first preset condition is determined as increasing the transmission power corresponding to the secondary carrier meeting the first preset condition. If the RSRP corresponding to the primary carrier is less than the RSRP corresponding to the secondary carrier meeting the first preset condition, the power adjustment direction corresponding to the secondary carrier meeting the first preset condition is determined as reducing the transmission power corresponding to the secondary carrier meeting the first preset condition.

For example, if $RSRP_P-RSRP_{Sj}>0$, the power adjustment direction of a carrier Sj is determined as increasing transmission power corresponding to the carrier Sj; and if $RSRP_P-RSRP_{Sj}<0$, the power adjustment direction of the carrier Sj is determined as reducing the transmission power corresponding to the carrier Sj.

The above embodiments describe the power control method from the perspective of the user equipment, and the following embodiments describe the power control method from the perspective of the base station. See the following embodiments for details.

The embodiments of the present disclosure provide a power control method, as shown in FIG. 2, which is performed by a base station, the method includes the following.

Step S201, indication information corresponding to one or more carriers meeting a first preset condition is received from a user equipment UE.

The one or more carriers meeting the first preset condition refer to a carrier generating image interference.

For the embodiments of the present disclosure, the indication information includes: both carrier identification and power adjustment information, or power adjustment information. In the embodiments of the present disclosure, the power adjustment information includes at least one of the following: a power adjustment step and a power adjustment direction or a target value for power adjustment.

Step S202, transmission power of the one or more carriers meeting the first preset condition is adjusted based on the indication information.

For the embodiments of the present disclosure, the base station may determine the one or more carriers meeting the first preset condition according to the carrier identification carried in the indication information. If the indication information does not include the carrier identification, a carrier carrying the indication information is determined to be the carrier meeting the first preset condition. Then, after determining the carrier meeting the first preset condition, the power adjustment information corresponding to each carrier meeting the first preset condition is determined, and the corresponding transmission power is adjusted according to the determined power adjustment information.

The embodiments of the present disclosure provide a power control method. Compared with related arts, in the embodiments of the present disclosure, the indication information corresponding to the carrier meeting the first preset condition is received from the user equipment UE, the carrier meeting the first preset condition refers to the carrier generating image interference, and then the transmission power of the carrier meeting the first preset condition is adjusted based on the indication information. That is, in the present disclosure, the transmission power of a carrier generating image interference is adjusted according to the indication information of the carrier generating image interference and sent by the user equipment, so that power difference of each carrier may be alleviated, and impact of demodulation performance of some carriers may be reduced, thus decline of overall communication performance of carrier aggregation may be alleviated.

In an implementation of the embodiments of the present disclosure, in response to determining that the carrier identification and the power adjustment information are carried in the indication information, the step S202 may specifically include: determining the carrier meeting the first preset condition based on the carrier identification; and adjusting the transmission power of the carrier meeting the first preset condition based on the power adjustment information.

For the embodiments of the present disclosure, if the indication information carries the carrier identification and the power adjustment information, the carrier meeting the first preset condition is determined based on the carrier identification, and corresponding power adjustment information of the carrier meeting the first preset condition is determined based on a relationship between the carrier identification and the power adjustment information, and the transmission power of the carriers meeting the first preset condition is adjusted based on the corresponding power adjustment information.

In another implementation of the embodiments of the present disclosure, in response to determining that the indication information carries the power adjustment information, the step S202 may specifically include: determining a carrier carrying the indication information to be the carrier meeting the first preset condition; and adjusting the carrier meeting the first preset condition based on the power adjustment information.

For the embodiments of the present disclosure, if the indication information does not include carrier identification, the base station may determine the carrier carrying the indication information to be the carrier meeting the first preset condition, and adjust the transmission power corresponding to the carrier meeting the first preset condition based on the power adjustment information carried in the indication information.

For the embodiments of the present disclosure, according to the above embodiments, the power adjustment information may include at least one of the following: a power adjustment step and a power adjustment direction; or a target value for power adjustment. In the embodiments of the present disclosure, if the power adjustment information carries a target value for power adjustment, the base station may adjust the transmission power corresponding to the carrier meeting the first preset condition to the target value for power adjustment; if the power adjustment information includes a power adjustment step and a power adjustment direction, the transmission power of the corresponding carrier meeting the first preset condition may be adjusted according to the power adjustment step and the power adjustment direction.

The above embodiments respectively describe the power control method from a user equipment side and a base station side. The following embodiments describe the power control method from the perspective of the interaction between the user equipment and the base station. See the following embodiments for details.

The embodiments of the present disclosure provide a power control method, as shown in FIG. 3, which includes the following.

Step S301, a user equipment determines the reference signal receiving power (RSRP) corresponding to each carrier.

Step S302, the user equipment determines one or more carriers meeting the first preset condition based on the RSRP corresponding to each carrier.

The one or more carriers meeting the first preset condition refer to a carrier generating image interference.

Step S303, the user equipment reports indication information corresponding to the one or more carriers meeting the first preset condition to a base station to make the base station adjust the transmission power of the one or more carriers meeting the first preset condition.

Step S304, the base station receives the indication information corresponding to the one or more carriers meeting the first preset condition from the user equipment UE.

The one or more carriers meeting the first preset condition refer to a carrier generating image interference.

Step S305, the base station adjusts the transmission power of the one or more carriers meeting the first preset condition based on the indication information.

For the embodiments of the present disclosure, the description of each step is detailed in the above embodiments and will not be repeated here.

The above embodiments describe corresponding operations of the power control method on a user equipment side and a base station side from a perspective of the method, as well as from a perspective of interaction. The following embodiments describe a user equipment and a base station from the perspective of virtual modules to implement the power control method. See the following embodiments for details.

The embodiments of the present disclosure provide a user equipment, as shown in FIG. 4, the user equipment 40 including a determining module 41 and a reporting module 42.

The determining module 41 is configured to determine reference signal receiving power (RSRP) corresponding to each carrier. The determining module 41 is further configured to determine one or more carriers meeting the first preset condition based on the RSRP corresponding to each carrier, and the one or more carriers meeting the first preset condition refer to a carrier generating image interference. The reporting module 42 is configured to report indication information corresponding to the one or more carriers meeting the first preset condition to a base station to make the base station adjust the transmission power of the one or more carriers meeting the first preset condition.

In an implementation of the embodiments of the present disclosure, the determining module 41 is further configured to determine reference signal receiving quality (RSRQ) corresponding to each carrier; when the determining module 41 determines the one or more carriers meeting the first preset condition based on the RSRP corresponding to each carrier, the determining module 41 may be specifically configured to determine the one or more carriers meeting the first preset condition based on the RSRP and RSRQ, respectively, corresponding to each carrier.

In an implementation of the embodiments of the present disclosure, the determining module 41 may be specifically configured to: determine the first RSRP and at least one piece of the second RSRP. The first RSRP includes RSRP corresponding to a primary carrier, and the second RSRP includes RSRP corresponding to a secondary carrier.

The one or more carriers meeting the first preset condition are determined based on a relationship between the first RSRP and each of the at least one piece of second RSRP.

In an implementation of the embodiments of the present disclosure, when determining the one or more carriers meeting the first preset condition based on the relationship between the first RSRP and each of the at least one piece of second RSRP, the determining module 41 is specifically configured to: determine an absolute value of the difference between the first RSRP and each of the second RSRP; and determine each secondary carrier corresponding to the second RSRP with an absolute value greater than a first preset threshold to be the carrier meeting the first preset condition.

In an implementation of the embodiments of the present disclosure, when determining the one or more carriers meeting the first preset condition based on the RSRP corresponding to each carrier and the RSRQ corresponding to each carrier, the determining module 41 is specifically configured to: determine the first RSRP and at least one piece of the second RSRP. The first RSRP includes the RSRP corresponding to a primary carrier, and the second RSRP includes the RSRP corresponding to a secondary carrier.

In response to determining that a relationship between the first RSRP and at least one piece of second RSRP meets a second preset condition, determine RSRQ corresponding to the primary carrier, and determine a relationship between the RSRQ corresponding to the primary carrier and a second preset threshold; determine the one or more carriers meeting the first preset condition based on the relationship between the RSRQ corresponding to the primary carrier and the second preset threshold.

In an implementation of the embodiments of the present disclosure, the relationship between the first RSRP and at least one piece of second RSRP meets the second preset condition includes: at least one piece of second RSRP is greater than the first RSRP, and the difference between the first RSRP and at least one piece of second RSRP is greater than a third preset threshold.

In an implementation of the embodiments of the present disclosure, when determining the one or more carriers meeting the first preset condition based on the relationship between the RSRQ corresponding to the primary carrier and the second preset threshold, the determining module 41 is specifically configured to: in response to determining that the RSRQ corresponding to the primary carrier is less than the second preset threshold, determine the primary carrier to be the carrier meeting the first preset condition; and in response to determining that the RSRQ corresponding to the primary carrier is not less than the second preset threshold, determine one or more secondary carriers, respectively corresponding to one or more pieces of second RSRP associated with the met second preset condition, to be the one or more carriers meeting the first preset condition.

In an implementation of the embodiments of the present disclosure, in response to determining that a number of carriers is greater than a fourth preset threshold, when determining the reference signal receiving power (RSRP) corresponding to each carrier, and determining the one or more carriers meeting the first preset condition based on the RSRP corresponding to each carrier, the determining module 41 is specifically configured to: determine the first RSRP, the first RSRP includes the RSRP corresponding to the primary carrier; determine at least one piece of third RSRP, the at least one piece of third RSRP includes the RSRP corresponding to each secondary carrier in one or more secondary carriers next to the primary carrier; and determine the one or more carriers meeting the first preset condition based on the first RSRP and the at least one piece of third RSRP.

In an implementation of the embodiments of the present disclosure, when reporting the indication information corresponding to the one or more carriers meeting the first preset condition to the base station, the reporting module 42 is specifically configured to: report at least one of the carrier identification corresponding to each carrier meeting the first preset condition, or the power adjustment information corresponding to each carrier meeting the first preset condition, to the base station.

The power adjustment information includes at least one of: a power adjustment step and a power adjustment direction; or a target value for power adjustment.

In an implementation of the embodiments of the present disclosure, when reporting at least one of the carrier identification corresponding to the carrier meeting the first preset condition or the power adjustment information corresponding to the carrier meeting the first preset condition to the base station, the reporting module 42 is specifically configured to least one of the following: determine the power adjustment information corresponding to one or more carriers meeting the first preset condition, and report the corresponding power adjustment information to the base station through the one or more carriers meeting the first preset condition; and/or determine the carrier identification and the power adjustment information, respectively, corresponding to each carrier meeting the first preset condition, and report the carrier identification and the power adjustment information corresponding to each carrier meeting the first preset condition to the base station through a preset carrier. The preset carrier may be the primary carrier or a preset secondary carrier, and the power adjustment information carried by the preset secondary carrier includes power adjustment information not corresponding to the preset secondary carrier.

In an implementation of the embodiments of the present disclosure, when determining the power adjustment step corresponding to any one of the one or more carriers meeting the first preset condition, the reporting module 42 is specifically configured to: based on the RSRP corresponding to the primary carrier, the RSRP corresponding to any one of the one or more carriers meeting the first preset condition, and the first preset threshold, determine a power adjustment step corresponding to any one of the one or more carriers meeting the first preset condition.

In an implementation of the embodiments of the present disclosure, when determining the power adjustment step corresponding to any one of the one or more carriers meeting the first preset condition based on the RSRP corresponding to the primary carrier, the RSRP corresponding to any one of the one or more carriers meeting the first preset condition and the first preset threshold, the reporting module 42 is specifically configured to: determine the difference between a first absolute value and the first preset threshold to be the power adjustment step corresponding to any one of the one or more carriers meeting the first preset condition. The first absolute value is the absolute value of the difference between the RSRP corresponding to the primary carrier and the RSRP corresponding to any one of the one or more carriers meeting the first preset condition.

In an implementation of the embodiments of the present disclosure, when determining a power adjustment direction corresponding to any one of the one or more carriers meeting the first preset condition, the reporting module 42 is specifically configured to: based on a relationship between the RSRP corresponding to the primary carrier and the RSRP corresponding to any one of the one or more carriers meeting the first preset condition, determine the power adjustment direction corresponding to any one of the one or more carriers meeting the first preset condition.

The embodiments of the present disclosure provide the user equipment. Compared with related arts, in the embodiments of the present disclosure, the RSRP corresponding to each carrier is determined, and one or more carriers meeting the first preset condition are determined based on the RSRP corresponding to each carrier. The carriers meeting the first preset condition refer to the carriers generating image interference. Then, the indication information corresponding to the one or more carriers meeting the first preset condition may be reported to the base station to make the base station adjust the transmission power of the one or more carriers meeting the first preset condition, so as to alleviate large power difference of each carrier, thus, impact of demodulation performance of some carriers may be reduced, and decline of overall communication performance of carrier aggregation may be alleviated.

The user equipment in these embodiments may perform the power control method performed by a user equipment in the above method embodiments. The implementation principles are similar, so it will not be repeated here.

Figure 5:
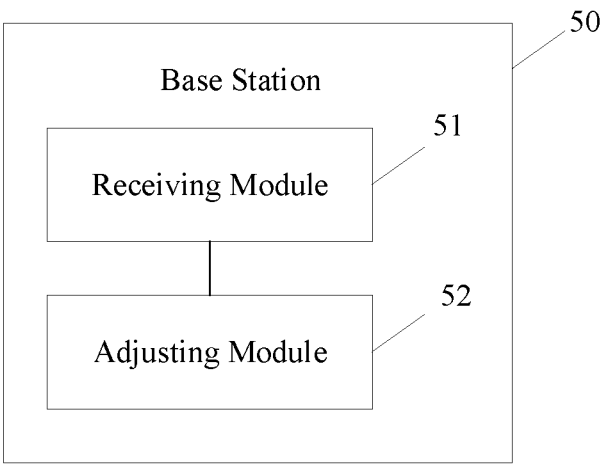
FIG. 5 is a schematic structure diagram illustrating a base station according to an embodiment of the present disclosure.

The embodiments of the present disclosure provide a base station 50, as shown in FIG. 5, including a receiving module 51 and an adjusting module 52.

The receiving module 51 is configured to receive indication information corresponding to one or more carriers meeting a first preset condition from a user equipment UE, and the one or more carriers meeting the first preset condition refers to a carrier generating image interference.

The adjusting module 52 is configured to adjust the transmission power of the one or more carriers meeting the first preset condition based on the indication information.

In an implementation of the embodiments of the present disclosure, in response to determining that carrier identification and power adjustment information are carried in the indication information, when adjusting the transmission power of the one or more carriers meeting the first preset condition based on the indication information, the adjusting module 52 is specifically configured to: determine the one or more carriers meeting the first preset condition based on the carrier identification; and adjust the transmission power of the one or more carriers meeting the first preset condition based on the power adjustment information.

In an implementation of the embodiments of the present disclosure, in response to determining that the power adjustment information is carried in the indication information, when adjusting the transmission power of the one or more carriers meeting the first preset condition based on the indication information, the adjusting module 52 is specifically configured to: determine a carrier carrying the indication information to be the carrier meeting the first preset condition; and adjust the one or more carriers meeting the first preset condition based on the power adjustment information.

The embodiments of the present disclosure provide a base station. Compared with related arts, in the embodiments of the present disclosure, the indication information corresponding to the carrier meeting the first preset condition is received from the user equipment UE, the carrier meeting the first preset condition refers to the carrier generating image interference, and then the transmission power of the carrier meeting the first preset condition is adjusted based on the indication information. That is, in the present disclosure, the transmission power of a carrier generating image interference is adjusted according to the indication information of the carrier generating image interference and sent by the user equipment, so that power difference of each carrier may be alleviated, and impact of demodulation performance of some carriers may be reduced, thus decline of overall communication performance of carrier aggregation may be alleviated.

The base station in these embodiments may perform the power control method performed by a base station in the above method embodiments. The implementation principles are similar, so it will not be repeated here.

In the above embodiments, a user equipment and a base station are described from the perspective of virtual modules. The following embodiments describe a user equipment and a base station from the perspective of physical devices. See the following embodiments for details.

Figure 6:
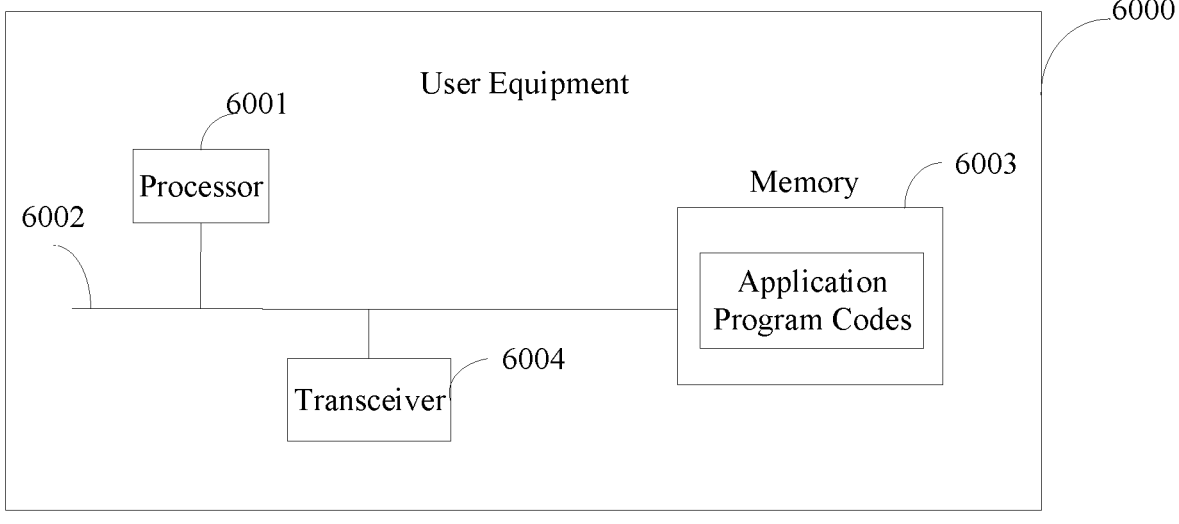
FIG. 6 is a schematic diagram illustrating a device structure of a user equipment according to an embodiment of the present disclosure.

The embodiments of the present disclosure provide a user equipment, as shown in FIG. 6. The user equipment 6000 includes a processor 6001 and a memory 6003. Where the processor 6001 is connected with the memory 6003, for example, through a bus 6002. Optionally, the user equipment 6000 may further include a transceiver 6004. It should be noted that in practical applications, the transceiver 6004 is not limited to one, and a structure of the user equipment 6000 does not constitute a limitation on the embodiments of the present disclosure.

The processor 6001 may be a CPU, a general processor, a DSP, an ASIC, a FPGA, or other programmable logic devices, transistor logic devices, hardware components, or any combination of the above. The processor 6001 may implement or perform various illustrative logic blocks, modules, and circuits described in the contents of the present disclosure. The processor 6001 may also be a combination to realize computing functions, such as including one or more microprocessor combinations, DSP and microprocessor combinations, and the like.

The bus 6002 may include a path for transmitting information between the components above. The bus 6002 may be a PCI bus or an EISA bus, or the like. Bus 6002 may be divided into address bus, data bus, control bus, and the like. For ease of representation, only a thick line is shown in FIG. 6, but it does not mean that there is only one bus or one type of bus.

The memory 6003 may be a ROM or other types of static storage devices that can store static information and instructions, a RAM or other types of dynamic storage devices that can store information and instructions, or a EEPROM, a CD-ROM or other optical disk storage (including compact discs, laser discs, optical discs, digital general purpose optical discs, blue-ray optical discs, and the like.), or disk storage media or other magnetic storage devices, or any other medium that can be used to carry or store expected program code in a form of instructions or data structures and can be accessed by a computer, but is not limited to the above.

The memory 6003 stores application program codes executing the technical solution of the present disclosure, and the execution is controlled by the processor 6001. The processor 6001 is for executing the application program codes stored in the memory 6003 to implement the contents shown in any of the aforementioned method embodiments performed by the user equipment.

The embodiments of the present disclosure provide the user equipment. Compared with related arts, in the embodiments of the present disclosure, the RSRP corresponding to each carrier is determined, and one or more carriers meeting the first preset condition are determined based on the RSRP corresponding to each carrier. The carriers meeting the first preset condition refer to the carrier generating image interference. Then, the indication information corresponding to the one or more carriers meeting the first preset condition may be reported to the base station to make the base station adjust the transmission power of the one or more carriers meeting the first preset condition, so as to alleviate large power difference of each carrier, thus, the impact of demodulation performance of some carriers may be reduced, and decline of overall communication performance of carrier aggregation may be alleviated.

The embodiments of the present disclosure provide a computer-readable storage medium on which a computer program is stored. When the program is executed by a processor, the method shown in the embodiments is implemented. Compared with related arts, in the embodiments of the present disclosure, the RSRP corresponding to each carrier is determined, and one or more carriers meeting the first preset condition are determined based on the RSRP corresponding to each carrier. The carriers meeting the first preset condition refer to the carrier generating image interference. Then, the indication information corresponding to the one or more carriers meeting the first preset condition may be reported to the base station to make the base station adjust the transmission power of the one or more carriers meeting the first preset condition, so as to alleviate large power difference of each carrier, thus, impact of demodulation performance of some carriers may be reduced, and decline of overall communication performance of carrier aggregation may be alleviated.

The embodiments of the present disclosure provide a computer-readable storage medium suitable for any one of the above embodiments of the power control method performed by a user equipment, which will not be repeated here.

Figure 7:
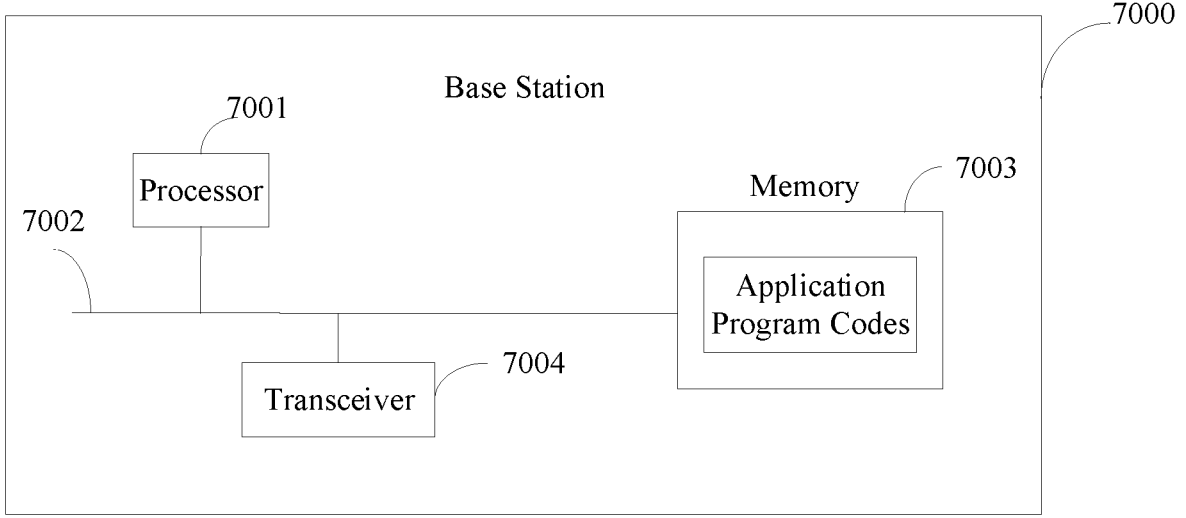
FIG. 7 is a schematic diagram illustrating a device structure of a base station according to an embodiment of the present disclosure.

Embodiments of the present disclosure provide a base station, as shown in FIG. 7. The base station 7000 in FIG. 7 includes: a processor 7001 and a memory 7003. Where the processor 7001 is connected with the memory 7003, for example, through a bus 7002. Optionally, the base station 7000 may also include a transceiver 7004. It should be noted that in practical applications, the transceiver 7004 is not limited to one, and a structure of the base station 7000 does not constitute a limitation on the embodiments of the present disclosure.

The processor 7001 may be a CPU, a general processor, a DSP, an ASIC, a FPGA, or other programmable logic devices, transistor logic devices, hardware components, or any combination of the above. The processor 7001 may implement or perform various illustrative logic blocks, modules, and circuits described in the contents of the present disclosure. The processor 7001 may also be a combination to realize computing functions, such as including one or more microprocessor combinations, DSP and microprocessor combinations, and the like.

The bus 7002 may include a path for transmitting information between the components above. The bus 7002 may be a PCI bus or an EISA bus, or the like. The bus 7002 may be divided into address bus, data bus, control bus, and the like. For ease of representation, only a thick line is shown in FIG. 7, but it does not mean that there is only one bus or one type of bus.

The memory 7003 may be a ROM or other types of static storage devices that can store static information and instructions, a RAM or other types of dynamic storage devices that can store information and instructions, or a EEPROM, a CD-ROM or other optical disk storage (including compact discs, laser discs, optical discs, digital general purpose optical discs, blue-ray optical discs, and the like.), or disk storage media or other magnetic storage devices, or any other medium that can be used to carry or store expected program code in a form of instructions or data structures and can be accessed by a computer, but is not limited to the above.

The memory 7003 stores application program codes executing the technical solution of the present disclosure, and the execution is controlled by the processor 7001. The processor 7001 is for executing the application program codes stored in the memory 7003 to implement the contents shown in any of the aforementioned method embodiments performed by the base station.

The embodiments of the present disclosure provide a base station. Compared with related arts, in the embodiments of the present disclosure, the indication information corresponding to the carrier meeting the first preset condition is received from the user equipment UE, the carrier meeting the first preset condition refers to the carrier generating image interference, and then the transmission power of the carrier meeting the first preset condition is adjusted based on the indication information. That is, in the present disclosure, the transmission power of a carrier generating image interference is adjusted according to the indication information of the carrier generating image interference and sent by the user equipment, so that power difference of each carrier may be alleviated, and impact of demodulation performance of some carriers may be reduced, thus decline of overall communication performance of carrier aggregation may be alleviated.

The embodiments of the present disclosure provide a computer-readable storage medium on which a computer program is stored. When the program is executed by a processor, the method shown in the embodiments is implemented. Compared with related arts, in the embodiments of the present disclosure, the indication information corresponding to the carrier meeting the first preset condition is received from the user equipment UE, the carrier meeting the first preset condition refers to the carrier generating image interference, and then the transmission power of the carrier meeting the first preset condition is adjusted based on the indication information. That is, in the present disclosure, the transmission power of a carrier generating image interference is adjusted according to the indication information of the carrier generating image interference and sent by the user equipment, so that power difference of each carrier may be alleviated, and impact of demodulation performance of some carriers may be reduced, thus decline of overall communication performance of carrier aggregation may be alleviated.

The embodiments of the present disclosure provide a computer-readable storage medium suitable for any one of the above embodiments of the power control method performed by a base station, which will not be repeated here.

It should be understood that, although the steps in the flowchart of the accompanying drawings are displayed in turn as indicated by the arrows, these steps are not necessarily performed in order as indicated by the arrows. Unless explicitly stated herein, the performance of these steps is not strictly limited in order, and they can be performed in any order. Moreover, at least a part of the steps in the flowchart of the accompanying drawings may include a plurality of sub-steps or stages. These sub-steps or stages are not necessarily completed at the same time, but may be performed at different times, and their performing order is not necessarily sequential, but can be performed in turn or alternately with other steps or at least a part of the sub-steps or stages of other steps.

The description above is only a part of the embodiments of the present disclosure. It should be pointed out that for the skilled in the technical field, certain improvements and modifications can be made without departing from the principle of the present disclosure, and these improvements and modifications should also be considered to fall within the scope of protection of the present disclosure.

The invention claimed is:

1. A power control method, performed by a user equipment (UE), comprising:

determining reference signal receiving power (RSRP) corresponding to each of carriers;

determining one or more carriers meeting a first preset condition based on the RSRP corresponding to each of the carriers, wherein the one or more carriers meeting the first preset condition refer to a carrier generating image interference; and reporting indication information corresponding to the one or more carriers meeting the first preset condition to a base station to make the base station adjust transmission power of the one or more carriers meeting the first preset condition;

wherein determining the one or more carriers meeting the first preset condition based on the RSRP corresponding to each of the carriers comprises:

determining first RSRP and one or more pieces of second RSRP, wherein the first RSRP comprises RSRP corresponding to a primary carrier and the second RSRP comprises RSRP corresponding to a secondary carrier;

in response to determining that a relationship between the first RSRP and at least one piece of second RSRP meets a second preset condition, determining reference signal receiving quality (RSRQ) corresponding to the primary carrier, and determining a relationship between the RSRQ corresponding to the primary carrier and a second preset threshold; and determining the one or more carriers meeting the first preset condition based on the relationship between the RSRQ corresponding to the primary carrier and the second preset threshold.

2. The method of claim 1, wherein the determining the one or more carriers meeting the first preset condition based on the RSRP corresponding to each of the carriers comprises:

determining the first RSRP and the one or more pieces of second RSRP; and determining the one or more carriers meeting the first preset condition based on a relationship between the first RSRP and each of the one or more pieces of second RSRP.

3. The method of claim 2, wherein the determining the one or more carriers meeting the first preset condition based on the relationship between the first RSRP and each of the one or more pieces of second RSRP comprises:

determining an absolute value of difference between the first RSRP and each of the one or more pieces of second RSRP; and determining each secondary carrier corresponding to second RSRP with the absolute value greater than a first preset threshold to be the carrier meeting the first preset condition.

4. The method of claim 1, wherein the relationship between the first RSRP and at least one piece of second RSRP meets the second preset condition comprises:

the at least one piece of second RSRP is greater than the first RSRP, and difference between the at least one piece of second RSRP and the first RSRP is greater than a third preset threshold.

5. The method of claim 1, wherein the determining the one or more carriers meeting the first preset condition based on the relationship between the RSRQ corresponding to the primary carrier and the second preset threshold comprises:

in response to determining that the RSRQ corresponding to the primary carrier is less than the second preset threshold, determining the primary carrier to be the carrier meeting the first preset condition; and in response to determining that the RSRQ corresponding to the primary carrier is not less than the second preset threshold, determining one or more secondary carriers respective corresponding to at least one piece of second RSRP associated with the relationship meeting the second preset condition to be the one or more carriers meeting the first preset condition.

6. The method of claim 1, wherein in response to determining that a number of the carriers is greater than a fourth preset threshold, determining the RSRP corresponding to each of the carriers and determining the one or more carriers meeting the first preset condition based on the RSRP corresponding to each of the carriers, comprise:

determining the first RSRP;

determining one or more pieces of third RSRP, wherein the third RSRP comprises RSRP corresponding to each of one or more secondary carriers next to the primary carrier; and determining the one or more carriers meeting the first preset condition based on the first RSRP and the one or more pieces of third RSRP.

7. The method of claim 1, wherein reporting the indication information corresponding to the one or more carriers meeting the first preset condition to the base station comprises:

reporting at least one of carrier identification or power adjustment information respective corresponding to each of the one or more carriers meeting the first preset condition to the base station, wherein the power adjustment information comprises at least one of:

a power adjustment step and a power adjustment direction; or a target value for power adjustment.

8. The method of claim 7, wherein reporting the at least one of the carrier identification or the power adjustment information respective corresponding to each of the one or more carriers meeting the first preset condition to the base station comprises at least one of:

determining the power adjustment information corresponding to each of the one or more carriers meeting the first preset condition, and reporting corresponding power adjustment information to the base station through the one or more carriers meeting the first preset condition; or determining the carrier identification and the power adjustment information respective corresponding to each of the one or more carriers meeting the first preset condition, and reporting the carrier identification and the power adjustment information respective corresponding to each of the one or more carriers meeting the first preset condition to the base station through a preset carrier, wherein the preset carrier comprises a primary carrier or a preset secondary carrier, and the power adjustment information carried by the preset secondary carrier comprises power adjustment information not corresponding to the preset secondary carrier.

9. The method of claim 7, wherein a power adjustment step corresponding to any one of the one or more carriers meeting the first preset condition is determined by:

determining a power adjustment step corresponding to any one of one or more secondary carriers meeting the first preset condition based on RSRP corresponding to a primary carrier, RSRP corresponding to the secondary carrier meeting the first preset condition, and a first preset threshold.

10. The method of claim 9, wherein determining the power adjustment step corresponding to the secondary carrier meeting the first preset condition based on the RSRP corresponding to the primary carrier, the RSRP corresponding to the secondary carrier meeting the first preset condition, and the first preset threshold, comprises:

determining difference between a first absolute value and the first preset threshold to be the power adjustment step corresponding to the secondary carrier meeting the first preset condition, wherein the first absolute value is an absolute value of difference between the RSRP corresponding to the primary carrier and the RSRP corresponding to the secondary carrier meeting the first preset condition.

11. The method of claim 7, wherein a power adjustment direction corresponding to any one of the one or more carriers meeting the first preset condition is determined by:

determining a power adjustment direction corresponding to any one of one or more secondary carriers meeting the first preset condition based on a relationship between RSRP corresponding to a primary carrier and RSRP corresponding to the secondary carrier meeting the first preset condition.

12. A non-transitory computer-readable storage medium, wherein the non-transitory computer-readable storage medium stores computer instructions which, when executed by a computer, cause the computer to perform the power control method according to the claim 1.

13. A power control method, performed by a system comprising a user equipment (UE) and a base station, comprising:

determining, by the UE, reference signal receiving power (RSRP) corresponding to each of carriers;

determining, by the UE, one or more carriers meeting a first preset condition based on the RSRP corresponding to each of the carriers, wherein the one or more carriers meeting the first preset condition refer to a carrier generating image interference;

receiving, by the base station, indication information corresponding to one or more carriers meeting a first preset condition from the UE; and adjusting, by the base station, transmission power of the one or more carriers meeting the first preset condition based on the indication information;

wherein determining, by the UE, the one or more carriers meeting the first preset condition based on the RSRP corresponding to each of the carriers comprises:

determining, by the UE, first RSRP and one or more pieces of second RSRP, wherein the first RSRP comprises RSRP corresponding to a primary carrier and the second RSRP comprises RSRP corresponding to a secondary carrier;

in response to determining that a relationship between the first RSRP and at least one piece of second RSRP meets a second preset condition, determining, by the UE, reference signal receiving quality (RSRQ) corresponding to the primary carrier, and determining, by the UE, a relationship between the RSRQ corresponding to the primary carrier and a second preset threshold; and determining, by the UE, the one or more carriers meeting the first preset condition based on the relationship between the RSRQ corresponding to the primary carrier and the second preset threshold.

14. The method of claim 13, wherein in response to determining that the indication information carries carrier identification and power adjustment information, adjusting, by the base station, the transmission power of the one or more carriers meeting the first preset condition based on the indication information comprises:

determining, by the base station, the one or more carriers meeting the first preset condition based on the carrier identification; and adjusting, by the base station, the transmission power of the one or more carriers meeting the first preset condition based on the power adjustment information.

15. The method of claim 13, wherein in response to determining that the indication information carries power adjustment information, adjusting, by the base station, the transmission power of the one or more carriers meeting the first preset condition based on the indication information comprises:

determining, by the base station, a carrier carrying the indication information to be the carrier meeting the first preset condition; and adjusting, by the base station, the one or more carriers meeting the first preset condition based on the power adjustment information.

16. A system, comprising:

one or more processors;

a memory; and one or more application programs, wherein the one or more application programs are stored in the memory and configured to be executed by the one or more processors to perform the power control method according to the claim 13.

17. A non-transitory computer-readable storage medium, wherein the non-transitory computer-readable storage medium stores computer instructions which, when executed by a computer, cause the computer to perform the power control method according to the claim 13.

18. A user equipment (UE), comprising:

one or more processors;

a memory; and one or more application programs, wherein the one or more application programs are stored in the memory and configured to be executed by the one or more processors to perform operations:

determining reference signal receiving power (RSRP) corresponding to each of carriers;

determining one or more carriers meeting a first preset condition based on the RSRP corresponding to each of the carriers, wherein the one or more carriers meeting the first preset condition refer to a carrier generating image interference; and reporting indication information corresponding to the one or more carriers meeting the first preset condition to a base station to make the base station adjust transmission power of the one or more carriers meeting the first preset condition;

wherein determining the one or more carriers meeting the first preset condition based on the RSRP corresponding to each of the carriers comprises:

determining first RSRP and one or more pieces of second RSRP, wherein the first RSRP comprises RSRP corresponding to a primary carrier and the second RSRP comprises RSRP corresponding to a secondary carrier;

in response to determining that a relationship between the first RSRP and at least one piece of second RSRP meets a second preset condition, determining reference signal receiving quality (RSRQ) corresponding to the primary carrier, and determining a relationship between the RSRQ corresponding to the primary carrier and a second preset threshold; and determining the one or more carriers meeting the first preset condition based on the relationship between the RSRQ corresponding to the primary carrier and the second preset threshold.

* * * * *